(12) United States Patent
Goerl et al.

(10) Patent No.: US 6,720,369 B2
(45) Date of Patent: Apr. 13, 2004

(54) MODIFIED RUBBER POWDERS COMPRISING SILICATIC FILLERS PREPARED FROM PRECIPITATION SUSPENSIONS, PROCESS FOR THEIR PREPARATION AND THEIR USE

(75) Inventors: Udo Goerl, Recklinghausen (DE); Reinhard Stober, Hasselroth (DE); Matthias Schmitt, Neckargemuend (DE); Andreas Gouw, Haltern (DE)

(73) Assignee: PKU Pulverkautschuk Union GmbH, Marl (DE)

( * ) Notice: Subject to any disclaimer, the term of this patent is extended or adjusted under 35 U.S.C. 154(b) by 0 days.

(21) Appl. No.: 09/987,748

(22) Filed: Nov. 15, 2001

(65) Prior Publication Data

US 2002/0091190 A1 Jul. 11, 2002

(30) Foreign Application Priority Data

Nov. 15, 2000 (DE) .......... 100 56 696

(51) Int. Cl.⁷ .................. C08K 9/00
(52) U.S. Cl. .......... 523/215; 523/200; 523/204; 523/201; 523/210; 524/495; 524/432; 524/422; 524/492
(58) Field of Search .......... 524/262, 399, 524/492, 261, 394, 442, 446, 493, 571, 495, 572, 496, 430, 432; 523/343, 213, 215, 200, 204, 210, 261

(56) References Cited

U.S. PATENT DOCUMENTS 6,177,495 B1 * 1/2001 Cohen .......... 524/262
6,329,449 B1 * 12/2001 Gorl et al. .......... 523/343
6,433,064 B1 * 8/2002 Gorl et al. .......... 524/492

* cited by examiner

*Primary Examiner*—Robert Deshon Harlan
(74) *Attorney, Agent, or Firm*—Oblon, Spivak, McClelland, Maier & Neustadt, P.C.

(57) ABSTRACT

A process for preparing silica-filled rubber powder is provided, which includes contacting a salt-containing silica-precipitation suspension with at least one selected from the group including a rubber latex, rubber solution, and rubber emulsion, to form a mixture; and precipitating to produce a silica-filled rubber powder. A silica-filled rubber powder prepared by the process, and compositions and uses containing the same, are also provided.

29 Claims, 1 Drawing Sheet

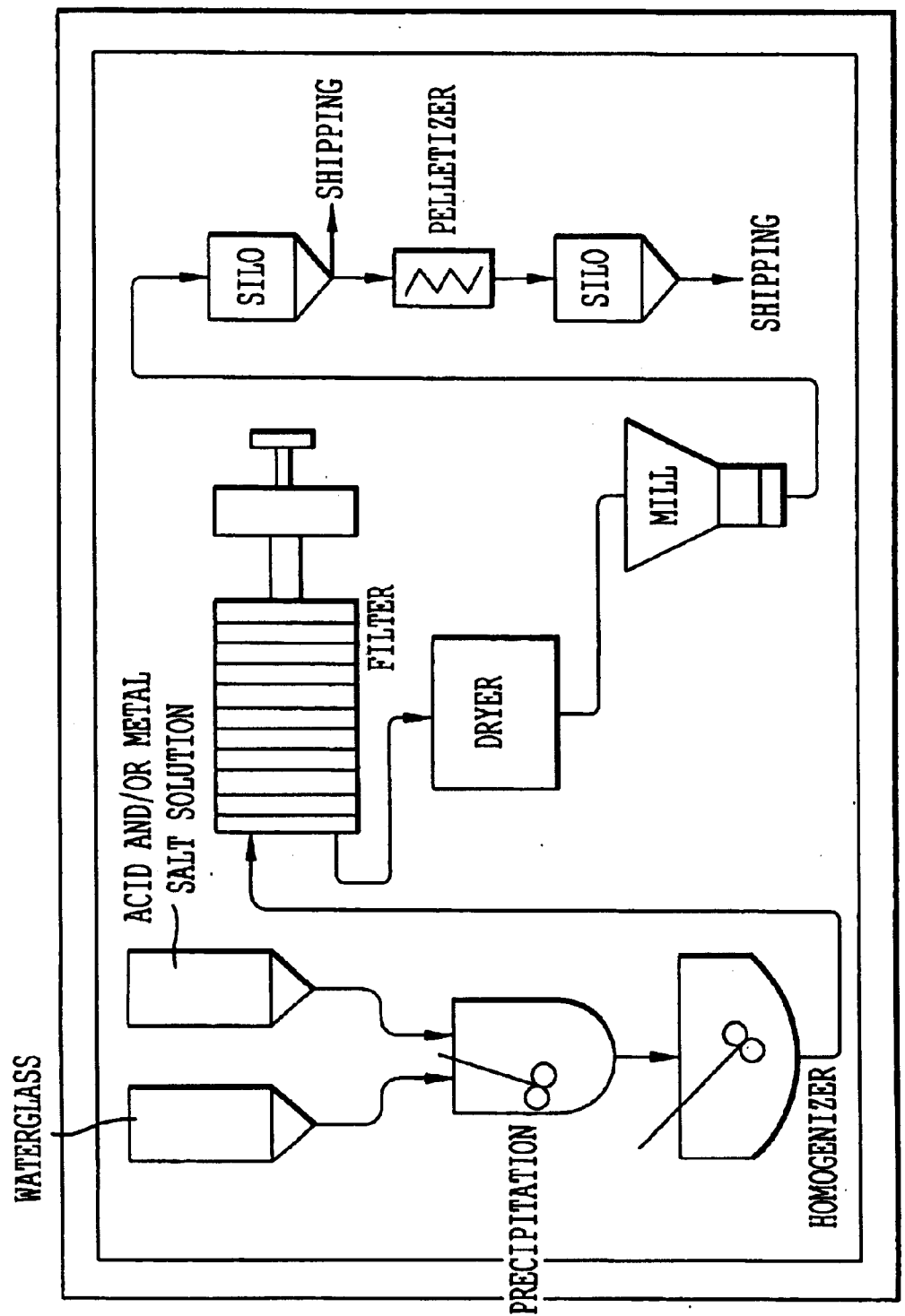

MODIFIED RUBBER POWDERS COMPRISING SILICATIC FILLERS PREPARED FROM PRECIPITATION SUSPENSIONS, PROCESS FOR THEIR PREPARATION AND THEIR USE

BACKGROUND OF THE INVENTION

1. Field of the Invention

The present invention relates to a process for preparing silica-filled rubber powder, silica-filled rubber powder prepared by the process, and compositions and uses including the same.

2. Discussion of the Background

A wide variety of publications have appeared concerning the preparation of rubber powders (U. Görl, K. H. Nordsiek, Kautsch. Gummi Kunstst. 51 (1998) 200; U. Görl, H. Lauer, Gummi Fasern Kunstst. 53 (2000) 261; and U. Görl, M. Schmitt, Paper given at ACS meeting, Rubber Division, Dallas, Tex., April 2000). Generally, these rubber poweder products are prepared via simultaneous precipitation, by means of a Lewis or Brönsted acid, of an aqueous filler suspension (inter alia precipitated silica) and of a latex emulsion.

FIG. 1 is a diagram of the preparation and work-up of precipitated silicas as currently used to the extent of some hundreds of thousands of metric tons annually in the rubber industry (S. Wolff, Text of lecture, rubber technology studies at Hanover University).

Silica is generally produced by precipitation from an alkali metal silicate solution by means of sulfuric acid, as given in the equation below:

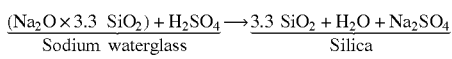
$$\underset{\text{Sodium waterglass}}{(Na_2O \times 3.3\ SiO_2)} + H_2SO_4 \longrightarrow \underset{\text{Silica}}{3.3\ SiO_2} + H_2O + Na_2SO_4$$

This means that precipitation in water (precipitation suspension) gives 3.3 mol of $SiO_2$ (silica) and 1 mol of alkali metal sulfate (generally $Na_2SO_4$). The filtration step that follows serves to remove most of the water and at the same time, in a complicated washing step, to separate the alkali metal sulfate from the silica. The silica-precipitation product from the filter press is generally termed filter cake. This includes about 20% solids and 80% water. All the water must then be removed in an energy-intensive drying process. The subsequent steps, such as milling and pelletizing, serve for further work-up of the silica so that it can be prepared as necessary and used in the rubber industry.

The publications and patents (DE 19816 972.8 and DE 198 43 301.8) which have appeared to date concerning the preparation of silicatic fillers, in particular concerning rubber powders containing silica fillers, start from salt-free washed filter cake, or even from dried silica. This means that high costs for investment in equipment and for the use of energy and other resources have been loaded onto the silica before it begins its use in the rubber powder.

Since high-activity precipitated silica fillers began to be used in tire tread mixtures, these being increasingly used since the start of the 90s, bifunctional organosilanes have been indispensable for achieving good tire properties when the aim is to improve rolling resistance (fuel saving) and wet skid resistance (EP 0,501,227; U.S. Pat. No. 5,227,425; G. Agostini, J. Bergh, Th. Materne; New Compound Technology, October 1994, Akron, Ohio, USA; and S. Wolff, The Influence of Fillers on Rolling Resistance, presented at the 129th Meeting of American Chemical Society, Rubber Division, New York, April 1986).

The most important representatives of these compounds in the rubber industry are bis(triethoxysilylpropyl)di- and -tetrasulfane (TESPD and TESPT, respectively) (U. Görl, Gummi Fasern Kunstst. 51 (1998) 416). The triethoxysilyl groups of both of these silanes react at elevated temperatures with the silanol groups of the silica. The user can carry out this reaction during preparation of the rubber mixture in the internal mixer or on the roll mill (U. Görl, A. Parkhouse, Kautschuk Gummi Kunstst. 52 (1999) 493; U. Görl, A. Hunsche, "Advanced Investigations into the Silica/Silane Reaction System", presented at the ACS meeting, Rubber Division, Louisville, Ky., USA, October 1996; and S. Wolff, "The Role of Rubber to Silica Bond in Reinforcement", presented at the First Franco-German Rubber Symposium, Nov. 14–16, 1985, Obernai, France). Another possibility is to react silica filler and organosilane with one another separately from the actual preparation of the rubber. The term then used is premodified filler (U. Görl, R. Panenka, Kautschuk Gummi Kunstst. 46 (1993) 538). The literature describes a wide variety of processes for this purpose.

DE 198 16 972.8 refers to a precipitation process for preparing rubber powder, in which suspensions of these fillers premodified with organosilicon compounds are prepared and stirred into the rubber emulsion.

DE 198 43 301.8 describes a process which uses a small number of stages and leads to a rubber powder with advantageous usage properties. This is based on direct addition of the silane to the silica suspension, and the silica starting material used here includes the filter cake or the dried product.

SUMMARY OF THE INVENTION

An object of the invention is to start from a salt-containing silica suspension in preparing rubber powders including precipitated silicatic fillers.

This and other objects have now been achieved by the present invention, the first embodiment of which provides a process for preparing silica-filled rubber powder, which includes contacting a salt-containing silica-precipitation suspension with at least one selected from the group including a rubber latex, rubber solution, and rubber emulsion, to form a mixture; and precipitating to produce a silica-filled rubber powder.

Another embodiment of the present invention provides a silica-filled rubber powder prepared by the above-mentioned process.

Another embodiment of the present invention provides a composition, which includes a silica-filled rubber powder, wherein the silica-filled rubber powder is prepared by the above-mentioned process.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein FIG. 1 is a diagram of silica precipitation and work-up.

DESCRIPTION OF THE PREFERRED EMBODIMENTS

Various other objects, features and attendant advantages of the present invention will be more fully appreciated as the same becomes better understood from the following detailed description of the preferred embodiments of the invention.

The invention provides a process for preparing fine-particle rubber/filler compounds (rubber powders) by precipitation from aqueous mixtures which include filler in the form of an alkali-sulfate-containing silica-precipitation suspension, and include water-soluble salts of at least one metal of group IIa, IIb, IIIa or VIII of the Periodic Table of the Elements and combinations thereof, and a rubber latex, an aqueous emulsion of a rubber, or a rubber solution, where:

(a) one or more organosilicon compounds) which contain at least one alkoxy group, emulsified, optionally in the presence of a surface-active substance, or dissolved in water, or the compounds mentioned without dilution, optionally with a surface-active substance, are mixed with the silica-precipitation suspension at a temperature of from 10 to 60° C., preferably at room temperature, with mixing, the amount of this mixture intended for incorporation into the rubber, based on the filler content alone, and particularly for low filler levels, being divided into two batches, and specifically in the latter case, (b) a first batch is mixed with the polymer latex, the polymer emulsion, or the polymer solution, and the pH of this mixture is lowered to a pH of from 8.0 to 6.5 using an acid, in particular using a Lewis acid (first batch, first stage), (c) the remainder (second batch, splitting fraction) is added with further lowering of the pH to 6.5–2.6 (second stage) so that the rubber still present in the mixture precipitates together with the filler modified by organosilicon compound(s), (d) the precipitated solid is isolated using methods known per se, (e) optionally, the solid isolated is washed salt-free and pH-neutral in a number of washing passes, and (f) the filled rubber is dried.

The drying advantageously takes place in a dryer with a gas inlet temperature of from 140 to 160° C. and with a gas outlet temperature of from 50 to 70° C. The temperature of the product should not exceed from 100 to 120° C. These ranges include all values and subranges therebetween including gas inlet temperatures of 145, 150 and 155° C.; gas outlet temperatures of 55, 60, and 65° C.; and product temperatures of 105, 110, and 115° C.

The duration and the extent of the precipitation procedure are pH-dependent and filler-content-dependent, and may readily be determined in a series of tests.

The level of silica filler in the rubber powder may be from 5 to 1000 parts, based on 100 parts of rubber. These ranges include all values and subranges therebetween including 10, 100, 200, 500, 600, 700, 800 and 900 parts, based on 100 parts of rubber. Preferably, the parts are parts by weight.

Preferably, for rubber powders with filler level >80 phr there is generally no need for any splitting fraction, since the products do not tend to adhere.

Preferably, for rubber powders with filler level of from 70 to 80 phr, from 0.5 to 10 parts of this amount are usually used as a remainder in the second stage during precipitation of the rubber powder.

Preferably, for rubber powders with silica filler levels below 70 parts, based on 100 parts of rubber, from >10 to 20 parts of this amount are then added in the form of a suspension into the mixture prior to conclusion of the precipitation procedure.

With the present invention, the fillers become bonded into the outer region of the rubber powder grains (peripheral region).

This means that there is not merely absorption of the filler onto the individual rubber particles (see DE-C 37 23 213), but integration of the filler into the surface of the rubber.

This distribution of filler and the nature of the binding of the fillers within the rubber composition bring about the high flowability of the powders of the invention and prevent caking during storage of the powders, these properties being retained on mechanical loading during conveying, silo-storage, etc.

Other preferable fillers include the carbon blacks known from the rubber industry, preferably in fine-particle (fluffy) form.

This makes the dispersion process easier, so that aqueous suspensions with filler particles of median particle diameter well below 10 $\mu$m are obtained without high energy costs. This range includes all values and subranges therebetween, including 1, 2, 3, 4, 5, 6, 7, 8, and 9 $\mu$m.

Metal salts which may be used are those which derive from elements of groups IIa, IIb, IIIa or VIII of the Periodic Table of the Elements. This Group system is in line with the earlier IUPAC recommendation (see Periodisches System der Elemente {Periodic Table of the Elements}, Verlag Chemie, Weinheim, 1985, the entire contents of which are hereby incorporated by reference). Preferable salts include magnesium chloride, zinc sulfate, aluminum chloride, aluminum sulfate, iron chloride, iron sulfate, cobalt nitrate and nickel sulfate, preference being given to the aluminum salts. Particular preference is given to aluminum sulfate and other Lewis acids.

The amount used of the salts is from 0.1 to 6.5 parts by weight per 100 parts by weight of rubber. This range includes all values and subranges therebetween including 0.2, 0.3, 0.5, 1, 2, 3, 4, 5, 5.5, 6, 6.1, 6.2, and 6.3 parts by weight per 100 parts by weight of rubber. The metal salts prove particularly suitable for controlling the grain size of the precipitated products. To set the desired pH, use is also made, where appropriate, of mineral acids, e.g. sulfuric acid, phosphoric acid or hydrochloric acid, particularly preferably sulfuric acid. However, it is also possible to use carboxylic acids, e.g. formic or acetic acid. The amount of acid depends on the nature and amount of the water-soluble metal salt, of the filler, of the organosilane used, of the rubber, and of any alkali metal silicate present.

The process of the invention is preferably carried out as follows:

First, the silica-precipitation suspension obtained from the silica precipitation and having high salt content (generally $Na_2SO_4$) is mixed, optionally, with the metal salt and the organosilane compound, optionally in the presence of an emulsifier.

As required by the filler content desired in the subsequent final product, the appropriate splitting fraction (filler levels $\leq$80 phr) is separated off. The total amount of water used depends on the nature of the filler and on the degree of disaggregation. The amount of non-water-soluble constituents in the suspension is generally from about 4 to 15 percent by weight, which range includes all values and subranges therebetwen including 5, 6, 7, 8, 9, 10, 11, 12, 13, and 14 parts by weight. The actual value may be above or below this value, which is not a binding restriction. The maximum content is restricted by the pumpability of the suspension. The resultant filler suspension is then intimately mixed with the rubber latex, optionally including alkali metal silicate solution, or with the aqueous emulsion, optionally including alkali metal silicate solution (first batch, first stage for filler levels ≦80 phr). Examples of known mixing systems suitable for this purpose are propeller stirrers.

After the mixing process, the homogeneous latex/filler mixture is precipitated, while stirring continuously, by adding acid, preferably $Al_2(SO_4)_3$. There is a variety of precipitation methods to be considered here, depending on the subsequent filler level:

a) For silica filler levels >80 parts, based on 100 parts of rubber (single-stage precipitation method)

The acid is used in a single-stage precipitation process to set a final pH value of from 8.5 to 2.8, preferably from 6.5 to 4.0. Due to the high filler level, there is no need for any splitting fraction for reducing tackiness. These ranges include all values and subranges therebetween, including 8.4, 8.3, 8, 7.5, 7, 6, 5, 4.5, 3.9, 3, and 2.9.

b) For silica filler levels ≦80 parts, based on 100 parts of rubber (two-stage precipitation method).

The abovementioned acid is first used to set a pH in the range from 8.0 to 5.0, whereupon core grains of rubber precipitate with a constant content of filler and of organosilane. The size of these core grains is controlled via the amount of metal salt selected within the range from 0.1 to 0.5 phr. The nature of this control is such that the smallest amount of metal salt gives the largest grain size.

The remainder of the filler suspension (second batch, splitting fraction) is added with further lowering of the pH to 6.5–2.6, in particular about 5.5–4.0 (second stage), so that the remaining rubber still present in the mixture precipitates together with the filler modified by organosilicon compound (s). The filler thus binds to the latex of the core grains and moreover forms a pure filler layer (core/shell type) around the grains suppressing adhesion to any adjacent grains. These ranges include all values and subranges therebetween, including 6.4, 6.3, 6, 5.6, 5.4, 5, 4,9, 4.5, 4.1, 3.9, 3, and 2.7.

The solids content of the latices used is generally from 20 to 60% by weight. The solids content of the rubber solutions is generally from 3 to 35% by weight, and that of the rubber emulsions is generally from 5 to 30% by weight. These ranges include all values and subranges therebetween, including 25, 30, 35, 40, 45, 50 and 55% by weight for the solids content of the latices; 4, 5, 10, 15, 20, 25 and 30% by weight for the solids content of the rubber solutions; and 10, 15, 20 and 25% by weight for the solids content of the rubber emulsions.

The process of the invention may be carried out either batchwise or else continuously.

The precipitated rubber powder is separated off, e.g. with the aid of a centrifuge, and then dried to a residual water content which is generally 1%, in particular in a fluidized-bed dryer or contact dryer.

The rubber powders of the invention are prepared using one or more organosilicon compounds of the general formula $(R_n-(RO)_{3-n}Si-(Alk)_m-(Ar)_p)_q(B)$     (I),

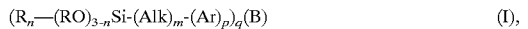

$R^1{}_n(RO)_{3-n}Si-(Alk)$     (II), or

$R^1{}_n(RO)_{3-n}Si-(Alkenyl)$     (III)

where

B is —SCN, —SH, —Cl, —NH$_2$ (if q=1) or —S$_x$- (if q=2)

R and R$^1$ are an alkyl group having from 1 to 4 carbon atoms, branched or unbranched, or the phenyl radical, where each of the radicals R and R$^1$ may have the same meaning or a different meaning, preferably an alkyl group, R is a $C_1$–$C_4$ alkyl or $C_1$–$C_4$-alkoxy group, branched or unbranched, n is 0, 1 or 2, Alk is a divalent straight-chain or branched hydrocarbon radical having from 1 to 6 carbon atoms, m is 0 or 1, Ar is an arylene radical having from 6 to 12 carbon atoms, p is 0 or 1, with the proviso that p and n are not simultaneously 0, x is a number from 2 to 8, Alkyl is a monovalent straight-chain or branched saturated hydrocarbon radical having from 1 to 20 carbon atoms, preferably from 2 to 8 carbon atoms, and Alkenyl is a monovalent straight-chain or branched unsaturated hydrocarbon radical having from 2 to 20 carbon atoms, preferably from 2 to 8 carbon atoms.

In the above formulas, q is preferably 1 or 2.

If these compounds are water-soluble, they are generally used in the form of solutions or else in the form of emulsions, and these emulsions may also be formed in the presence of the silica suspension.

The emulsion or solution is preferably prepared at room temperature. However, temperatures from 10 to 60° C. are also suitable. This range includes all values and subranges therebetween, including 15, 20, 25, 30, 35, 40, 45, 50 and 55° C.

The concentration of the organosilane compound(s) in the suspension is from 0.5 to 20% by weight, preferably from 5 to 12% by weight, based on the total amount of the filler used. These ranges include all values and subranges therebetween, including 0.7, 1, 2, 4, 10, 11, 13, 14, 15, 16, and 18% by weight, based on the total amount of filler used.

For the purposes of the present invention, the term non-water-soluble means that once the organosilane compound (without any surface-active substance) has been mixed with the suspension of the filler, in the desired pH and concentration range, there is no formation of a clear solution around the filler particles. Rather, there continues to be separate phases composed of water, solids and organosilicon compound(s).

The oligosulfidic organosilanes of the general formula I given above are known per se and may be prepared by known processes. Preferred organosilanes include bis (trialkoxysilylalkyl) oligosulfides which can be prepared as in Belgian patent 787 691 (the entire contents of which are hereby incorporated by reference), for example, bis (trimethoxy-, -triethoxy-, -dimethoxy-, -ethoxy-, -tripropoxy-, -tributoxy-, -triisopropoxy- and -triisobutoxysilylmethyl) oligosulfides and in particular specifically the di-, tri-, tetra-, penta- and hexasulfides, etc., and also bis(2-trimethoxy-, -triethoxy-, -dimethoxyethoxy-, -tripropoxy- and -tri-n- and -isobutoxyethyl) oligosulfides, and specifically in particular the di-, tri-, tetra-, penta- and hexasulfides, etc., and also bis(3-trimethoxy-, -triethoxy-, -dimethoxyethoxy-, -tripropoxy-, -tri-n-butoxy- and -tri{isobutoxysilylpropyl} oligosulfides, and in turn specifically the di-, tri- and tetrasulfides, etc., up to octasulfides, and moreover the corresponding bis(3-trialkoxysilylisobutyl) oligosulfides, and the corresponding bis(4-trialkoxysilylbutyl) oligosulfides.

Of these selected, relatively simply structured organosilanes of the general formula I preference is in turn given to bis(3-trimethoxy-, -triethoxy- and -tripropoxysilylpropyl)

oligosulfides, and specifically to the di-, tri-, tetra- and pentasulfides, in particular the triethoxy compounds having 2, 3 or 4 sulfur atoms, and mixtures of these. Alk in the general formula I is a divalent, straight-chain or branched hydrocarbon radical, preferably a saturated alkylene radical having a straight carbon chain having from 1 to 4 carbon atoms.

Other specifically suitable silanes are those of the following structural formulae

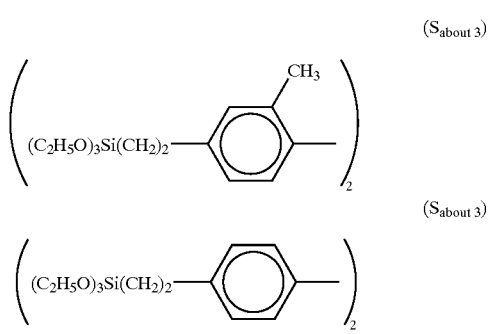

and methoxy analogs of these, and these may be prepared as in DE-B 25 58 191 (the entire contents of which are hereby incorporated by reference). These compounds are not water-soluble.

Preferred surface-active substances used in this case are non-ionogenic, cationic or anionic surfactants. Their concentration in the emulsion is from 1 to 15% by weight, preferably from 2 to 10% by weight, based on the amount of organosilane compounds. These ranges include all values and subranges therebetween, including 3, 4, 5, 6, 7, 8, 9, 11, 12, 13 and 14% by weight.

Preferred examples of surfactants of this type include:
alkylphenol polyglycol ethers,
alkyl polyglycol ethers, polyglycols,
alkyltrimethylammonium salts, dialkyldimethylammonium salts, alkylbenzyltrimethylammonium salts, alkylbenzenesulfonates,
alkyl hydrogensulfates, alkyl sulfates.

The precipitated silica fillers to be modified, in the form of a precipitation suspension, or else as a mixture of two or more of these fillers, are silica fillers known per se from rubber technology.

An important precondition for their suitability is that silanol groups are present on the surface of the filler particles and are capable of reacting with the alkoxy groups of the organosilicon compounds.

In this context, the term "modified fillers" means that there is bonding of the organosilane compounds to the surface either by chemical reaction (Si—OH groups) or by adsorption.

The groups bonded by adsorption are converted into chemically bonded groups by the drying step.

The amounts of the emulsion mixed with the filler suspension are such that the concentration of the organosilicon compound is from 0.5 to 20% by weight, preferably from 5 to 12% by weight, based on the amount of filler. The modified fillers include from 0.5 to 20% by weight, preferably from 5 to 12% by weight, of the organosilicon compounds, based on the dry filler. These ranges include all values and subranges therebetween, including 0.7, 1, 2, 3, 4, 6, 7, 8, 9, 10, 11, 13, 14, 15, 16, 17, 18, and 19% as appropriate.

They are particularly suitable for use in vulcanizable and moldable rubber mixtures.

The silica-precipitation suspensions used are intermediates which then give silicas as are known from the rubber sector. The precipitation suspensions have solids contents of from 10 to 130 g/l and pHs in the acidic range. For conversion to the rubber powder, the pH has sometimes to be adjusted to 5–8, preferably to 6 and more preferably to 7. Sodium hydroxide solution, for example, is suitable for this purpose. These ranges include all values and subranges therebetween, including 20, 40, 60, 80, 100 and 120 g/l for the solids contents.

Using measurements made by the known BET method, the dried products generally have an $N_2$ surface area of from 35 to 700 $m^2/g$, a CTAB surface area of from 30 to 500 $m^2/g$, and a DBP value of from 150 to 400 ml/100 g. These ranges include all values and subranges therebetween, including 40, 45, 100, 150, 250, 350, 500, and 600 $m^2/g$ ($N_2$ surface area); 35, 40, 80, 100, 150, 200, 250, 300, 350, and 400 $m^2/g$ (CTAB surface area); and 175, 200, 225, 250, 300, 325, 350 and 375 ml/100 g (DBP value).

The dried product of the invention, prepared from a silica-precipitation suspension, includes from 5 to 1000 parts of silicas, in particular from 20 to 100 parts, based on 100 parts of rubber. These ranges include all values and subranges therebetween, including 10, 15, 25, 35, 50, 150, 300, 500, 600 and 700 parts of silicas, based on 100 parts of rubber.

It is also possible to prepare filled rubber powders whose mixture includes silicas based on silica-precipitation suspensions and carbon black.

Particularly suitable carbon blacks are those generally used in rubber processing.

These include furnace blacks, gas blacks and flame blacks with an iodine adsorption value of from 5 to 1000 $m^2/g$, a CTAB value of from 15 from 600 $m^2/g$, a DBP adsorption of from 30 to 400 ml/100 g and a 24 M4 DBP value of from 50 to 370 ml/100 g, in amounts of from 5 to 100 parts, in particular from 20 to 100 parts, based on 100 parts of rubber. These ranges include all values and subranges therebetween, including (for iodine adsorption value) 10, 20, 100, 200, 300, 400, 500, 600, 700, 800, and 900 $m^2/g$; (for CTAB value) 20, 30, 50, 100, 200, 300, 400, and 500 $m^2/g$; (for DBP adsorption) 35, 40, 100, 150, 200, 250, 300 and 350 ml/100 g; (for 24 M4 DBP value) 55, 60, 90, 100, 200, and 300 ml/100 g; and (for amounts) 10, 15, 25, 30, 50, 60, 70, 90 and 95 parts.

Preferable types of rubbers which have been found to be capable of use and of preparation in the form of aqueous emulsions, individually or in a mixture with one another include natural rubber, SBR emulsions with styrene content of from 10 to 50%, butyl-acrylonitrile rubber, butyl rubbers, terpolymers made from ethylene, propylene (EPM) and non-conjugated dienes (EPDM), butadiene rubbers, SBR prepared by solution polymerization with styrene content of from 10 to 25%, and also with from 20 to 55% content of 1,2-vinyl constituents, or isoprene rubbers in particular 3,4-polyisoprene.

For polymers prepared by solvent processes, the solvent content requires that particular preventive measures be taken.

Besides the rubbers mentioned, the following elastomers (rubbers) are also preferred, individually or in a mixture:

Carboxyl rubbers, epoxy rubbers, trans-polypenteneamers, halogenated butyl rubbers, 2-chlorobutadiene-based rubbers, ethylene-vinyl acetate copolymers, epichlorohydrins, and, where appropriate, chemically modified natural rubber, e.g. epoxidized grades.

Besides the abovementioned fillers, the rubber powders of the invention include, where appropriate, known processing aids or vulcanizing auxiliaries, for example zinc oxide, zinc stearate, stearic acid, polyalcohols, polyamines, plasticizers, agents to prevent aging caused by heat, light, oxygen or ozone, reinforcing resins, flame retardants, e.g. $Al(OH)_3$ or $Mg(OH)_2$, pigments, various crosslinking chemicals and, where appropriate, sulfur in the concentrations conventional in rubber technology. Mixtures are possible.

An especially preferred embodiment of the invention provides a process for preparing organosilane-modified silicatic fillers, in particular to rubber powders containing precipitated silicas, where the filler used as starting material includes a silica-precipitation suspension produced from waterglass and sulfuric acid and having high salt content, in particular including sodium sulfate, and also to the resultant powders.

The invention permits the preparation of fine-particle rubber powder that includes silica modified with organosilicon compounds and starting from a silica-precipitation suspension, the powder being flowable and remaining flowable even after exposure to mechanical stress (e.g. conveying, packing).

The fine-particle nature of the powder means that fine-particle dispersions can be obtained without any need for milling or other comminution measures.

These dispersions then give the fine-particle rubber powders which are easy to process and give vulcanizates with improved properties.

EXAMPLES

Having generally described this invention, a further understanding can be obtained by reference to certain specific examples which are provided herein for purposes of illustration only and are not intended to be limiting unless otherwise specified.

Raw materials used in the preparation process:

E-SBR emulsion styrene-butadiene latex with 23.5% styrene content (BSL)

Si 69 bis(triethoxysilylpropyl)tetrasulfane (Degussa-Hüls AG)

Ultrasil 7000 precipitated silica with $N_2$ surface area (BET) of 185 $m^2/g$ and improved dispersion properties (Degussa-Hüls AG) in the form of silica-precipitation suspension Ultrasil VN 3 standard precipitated silica with $N_2$ surface area of 175 $m^2/g$ in the form of silica-precipitation suspension Marlipal 1618/25 emulsifier: fatty alcohol polyethylene glycol ether (Degussa-Hüls AG)

Example I

Preparation of rubber powder based on E-SBR, Ultrasil 7000 precipitation suspension and Si 69:

A stable suspension is prepared, with stirring, from 1 792.7 g of Ultrasil 7000 precipitation suspension (8.5% solids content), Si 69 (corresponding to 8 parts, based on 100 parts of dry silica), and 1.6 g of Marlipal 1618/25 (corresponding to 1%, based on silica) in 1.5 l of water, and then sufficient suspension is extracted so that the silica content for splitting is about 7 parts of the total amount of silica.

The main portion of the suspension is mixed with 896.1 g of a 22.3% strength E-SBR latex emulsion, with vigorous stirring, and its pH is then lowered to 5.5 by adding an approximately 10% strength $Al_2(SO_4)_3$ solution. This first precipitation step is followed by addition of the second part of the suspension, prepared as above, and then the pH is lowered to a final value of 4.0. After about 5 min of continued reaction, most of the water is separated mechanically, and this is followed by a drying step, to residual moisture of <1%. The pulverulent finished product (EPR 1) includes 100 parts of E-SBR and 80 parts of Ultrasil 7000/Si 69 (8 parts, based on 100 parts of silica, or 6.5 phr), as determined by thermogravimetric analysis (TGA).

Example II

Preparation of rubber powder based on E-SBR, Ultrasil VN 3 precipitation suspension and Si 69 (filler level 80 phr, amount of silane 6.5 phr):

Weighing-out and procedure are as in Example I, the only difference being that Ultrasil VN 3 precipitation suspension is used instead of the Ultrasil 7000 precipitation suspension.

TGA study of the final product, EPR 2, gave 77 phr of filler.

The products used in vulcanization were as follows:

Mixture components:

E-SBR 1500 styrene-butadiene rubber with 23.5% styrene content (bale rubber)

Enerthene 1849-1 arom. mineral oil plasticizes (BP)

EPR 1 rubber powder composed of 100 parts of E-SBR 1500, 80 parts of Ultrasil 7000/Si 69 (6.5 phr) (from silica-precipitation suspension)

EPR 2 rubber powder composed of 100 parts of E-SBR 1500 latex, 77 phr of Ultrasil VN 3 (from precipitation suspension) and 6.5 phr of Si 69

6 PPD N-(1,3-dimethylbutyl)-N-phenyl-p-phenylenediamine

CBS benzothiazyl-2-cyclohexylsulfenamide

DPG diphenylguanidine

Ultrasil 7000 GR high-dispersion tire silica ($N_2$ surface area 185 $m^2/g$), Degussa-Hüls AG Ultrasil VN 3 GR standard silica (N2 surface area 175 $m^2/g$), Degussa-Hüls AG The following vulcanizate test methods were used, and are each incorporated herein by reference in their entirety:

Vulcameter DIN 53 529/3

Ring tensile test DIN 53 504

Shore hardness DIN 53 505

Elongation at break DIN 53504

Fracture energy DIN 53504

300% modulus DIN 53504

Example A

Comparison of vulcanizate property profile of inventive product (preparation example 1) with that of a standard mixture:

| (a) Mixing specification | | |
|---|---|---|
| Mixture | 1 (phr) | 2 (phr) |
| SBR 1500 | 100 | — |
| EPR 1 | — | 180 |
| Ultrasil 7000 Gran | 80 | — |
| Si 69 | 6.5 | — |
| Enerthene 1849-1 | 30 | 30 |
| ZnO RS | 3 | 3 |
| Stearic acid | 2 | 2 |
| 6 PPD | 2 | 2 |
| Wax | 1 | 1 |
| CBS | 1.7 | 1.7 |

-continued

(a) Mixing specification

| Mixture | 1 (phr) | 2 (phr) |
|---|---|---|
| DPG | 2 | 2 |
| Sulfur | 1.5 | 1.5 |

(b) Mixing process

1st stage

Internal mixer: GK 1.5E; volume 1.5 L; friction 1:1; ram 5.5 bar

| Mixture | 1 | 2 |
|---|---|---|
| Filler level | 0.55 | 0.6 |
| RPM | 50 | 40 |
| Chamber temperature (° C.) | 60 | 60 |

| | | |
|---|---|---|
| 0–0.5' SBR 1500 | 0–1' EPR 1, ZnO, | |
| 0.5–1' ½ Ultrasil 7000 | stearic acid, | |
| ½ Si 69, oil, Zno, | oil, 6 PPD, wax | |
| stearic acid, wax | | |
| 1–2' ½ Ultrasil 7000, | 1–4' mixing and discharge | |
| ½ Si 69, 6 PPD | | |
| 2' cleaning | | |
| 2–4' mixing and discharge | | |
| Discharge temperature ~135° C. | Discharge temperature ~135° C. | |

2nd Stage

Internal mixer: GK 1.5E; volume 1.5L; friction 1:1; ram 5.5 bar; RPM 30; filler level 0.53; chamber temperature 60° C.

Both mixtures

0–1.5' batch stage 1, accelerator, sulfur
1.5' discharge and milled sheet drawn off

(c) Vulcanizate property profile (vulcanization temperatures 165° C.)

| | 1 Standard | ERBI |
|---|---|---|
| $D_{max} - D_{min}$ (Nm) | 37.0 | 38.4 |
| $t_{10\%}$ (min) | 5.1 | 4.1 |
| $t_{90\%}$ (min) | 9.8 | 9.0 |
| $t_{90\%} - t_{10\%}$ (min) | 4.7 | 4.9 |
| Tensile strength (MPa) | 17.0 | 17.9 |
| 300% modulus (MPa) | 11.8 | 13.2 |
| Shore hardness | 61 | 70 |

The product of the invention has higher reinforcement performance than the standard, i.e. rubber powder technology permits a silica-precipitation suspension to be used as starting material for a product which has the properly profile of a standard mixture starting from a bale rubber and from a pelletized silica, but the product is obtained with a marked reduction in processing steps which are energy-intensive or require high levels of investment.

Example B

Comparison of vulcanizate property profile of inventive product (EPR 2) with that of a standard mixture:

(a) Mixing specification

| Mixture | 1 Standard (phr) | 2 EPR 2 (phr) |
|---|---|---|
| SBR 150 | 100 | — |
| Ultrasil VN 3 GR | 75 | — |
| EPR 2 | — | 177 |
| Si 69 | 6.5 | — |
| ZnO RS | 3 | 3 |
| Stearic Acid | 2 | 2 |
| Enerthene 1849-1 | 15 | 25 |
| 6 PPD | 1.5 | 1.5 |
| Wax | 1 | 1 |
| CBS | 1.7 | 1.7 |
| DPG | 2 | 2 |
| Sulfur | 1.5 | 1.5 |

(b) Preparation of Mixture

See Example A

(c) Vulcanizate property profile

| Mixture | 1 (standard) | 2 (EPR 2) |
|---|---|---|
| Tensile Strength (MPa) | 17.4 | 20.8 |
| 300% modulus (MPa) | 6.9 | 7.9 |
| Elongation at break (%) | 560 | 580 |
| Fracture energy (J) | 131.7 | 166.5 |
| Shore hardness | 65 | 72 |

The product of the invention shows advantages in reinforcement performance and in the values for strength.

Obviously, numerous modifications and variations of the present invention are possible in light of the above teachings. It is therefore to be understood that within the scope of the appended claims, the invention may be practiced otherwise than as specifically described herein.

This application is based on German patent application DE 10056696.0, filed Nov. 15, 2000, the entire contents of which are hereby incorporated by reference, the same as if set forth at length.

What is claimed is:

1. A process for preparing silica-filled rubber powder, comprising:
   contacting:
      a water-soluble salt containing aqueous silica-precipitation suspension, with
      at least one member selected from the group consisting of rubber latex, rubber solution, and rubber emulsion,
   to form a mixture; and
   precipitating to produce a silica-filled rubber powder wherein the process further comprises:
      (a) mixing one or more organosilicon compound(s) which contain at least one alkoxy group with the silica-precipitation suspension at a temperature of 10 to 60° C., said organosilicon compound(s) being undiluted, emulsified, or dissolved in water, and optionally in the presence of one or more surface-active substances, to form a masterbatch, and dividing the masterbatch into first and second batches;
      (b) mixing the first batch with the rubber latex, rubber solution, or rubber emulsion and adding at least one first acid to lower the pH to between 8.0 and 6.5 inclusive to form a mixture and precipitating silica-filled rubber particles;

(c) adding the second batch to the mixture and adding at least one second acid to lower the pH to between 6.5 and 2.6 inclusive to form a mixture and precipitating silica-filled rubber particles;

(d) isolating the precipitated silica-filled rubber particles;

(e) optionally, washing the precipitated silica-filled rubber particles to obtain salt-free and pH-neutral precipitated silica-filled rubber particles; and (f) drying to obtain the silica-filled rubber powder.

2. The process as claimed in claim 1, wherein the silica-precipitation suspension comprises at least one silica modified with one or more organosilicon compounds.

3. The process as claimed in claim 1, wherein the silica-precipitation suspension comprises at least one silica modified with at least one organosilicon compound selected from the group consisting of the following formulas I,II,III, and combinations thereof:

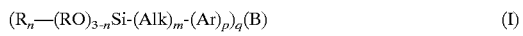   (I)

   (II)

   (III);

where q is 1 or 2

B is —SCN, —SH, —Cl, —NH$_2$ (if q=1) or —S$_x$-(if q=2)

R and R$^1$ are independently an alkyl group having from 1 to 4 carbon atoms, branched or unbranched, phenyl radical, where each of the radicals R and R$^1$ may have the same meaning or a different meaning, R is a C$_1$–C$_4$-alkyl or C$_1$–C$_4$-alkoxy group, branched or unbranched, n is 0, 1 or 2, Alk is a divalent straight-chain or branched hydrocarbon radical having from 1 to 6 carbon atoms, m is 0 or 1, Ar is an arylene radical having from 6 to 12 carbon atoms, p is 0 or 1, with the proviso that p and n are not simultaneously 0, x is a number from 2 to 8, Alkyl is a monovalent straight-chain or branched saturated hydrocarbon radical having from 1 to 20 carbon atoms, and Alkenyl is a monovalent straight-chain or branched unsaturated hydrocarbon radical having from 2 to 20 carbon atoms.

4. The process as claimed in claim 1, wherein the silica-precipitation suspension comprises at least one silica modified with at least one organosilicon compound selected from the group consisting of silanes having the following formulas:

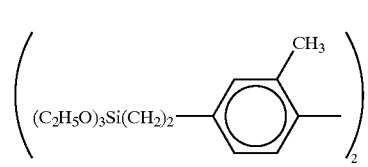 (S$_{about\,3}$)

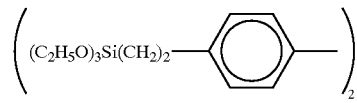 (S$_{about\,3}$)

and methoxy analogs thereof.

5. The process as claimed in claim 1, wherein the silica-precipitation suspension comprises at least one silica modified with at least one organosilicon compound, and wherein the organosilicon compound is bonded to a surface of said said silica either by chemical reaction or adsorption to said surface.

6. The process as claimed in claim 1, wherein the silica-precipitation suspension has a solids content of from 10 to 130 g/l.

7. The process as claimed in claim 1, wherein the silica-precipitation suspension comprises at least one organosilane compound in an amount of 0.5 to 20% by weight, based on a total amount of filler.

8. The process as claimed in claim 1, wherein when said silica-filled rubber powder comprises silica filler in a total amount of 70 to 80 parts by weight, based on 100 parts by weight of said rubber, said process comprises a second stage wherein from 0.5 to 10 parts of the total amount is contacted with a portion of said rubber latex, rubber solution, or rubber emulsion, and precipitated.

9. The process as claimed in claim 1, wherein said silica-filled rubber powder comprises silica filler in a total amount below 70 parts by weight, based on 100 parts by weight of said rubber, said process comprises adding from >10 to 20 parts of the total amount are added to said mixture during the precipitation.

10. The process as claimed in claim 1, wherein said salt in said salt-containing silica-precipitation suspension is one or more water-soluble salts of a metal of group IIa, IIb, IIIa or VIII of the Periodic Table of the Elements.

11. The process as claimed in claim 1, wherein said salt-containing silica-precipitation suspension comprises one or more alkali sulfates.

12. The process as claimed in claim 1, wherein said salt-containing silica-precipitation suspension comprises an alkali sulfate and one or more water-soluble salts of a metal of group IIa, IIb, IIIa or VIII of the Periodic Table of the Elements.

13. The process as claimed in claim 1, wherein said first acid is a Lewis acid.

14. The process as claimed in claim 1, wherein said second acid is a Lewis acid.

15. The process as claimed in claim 1, wherein in (a) the mixing is carried out in the presence of one or more surface-active substances.

16. The process as claimed in claim 1, wherein the silica-precipitation suspension further comprises carbon black.

17. The process as claimed in claim 1, wherein the silica-precipitation suspension further comprises carbon black in an amount of 5 to 100 parts by weight, based on 100 parts by weight of rubber.

18. The process as claimed in claim 1, wherein said salt in said salt-containing silica-precipitation suspension is one or more water-soluble salts of a metal of group IIa, IIb, IIIa or VIII of the Periodic Table of the Elements and is present in an amount of 0.1 to 6.5 parts by weight, based on 100 parts by weight of rubber.

19. The process as claimed in claim 1, wherein the rubber is selected from the group consisting of natural rubber, emulsion SBR with styrene content of from 10 to 50%, butyl-acrylonitrile rubber, butyl rubber, terpolymers made from ethylene, propylene (EPM) and nonconjugated dienes (EPDM), butadiene rubber, SBR prepared by solution polymerization with styrene content of from to 25% and with 1,2-vinyl constituent of 20 to 55%, isoprene rubber, and combinations thereof.

20. The process as claimed in claim 1, further comprising adding at least one selected from the group consisting of conventional processing aids, vulcanization auxiliaries, and combinations thereof during the precipitation.

21. The process as claimed in claim 1, wherein the contacting is carried out in the presence of alkali metal silicate.

22. The process as claimed in claim 1, further comprising washing the silica-filled rubber powder.

23. The process as claimed in claim 1, further comprising drying the silica-filled rubber powder.

24. The process as claimed in claim 1, further comprising contacting the silica-filled rubber powder with a vulcanizable rubber mixture.

25. The process as claimed in claim 1, further comprising contacting the silica-filled rubber powder with a vulcanizable rubber mixture and vulcanizing.

26. The process as claimed in claim 1, further comprising contacting the silica-filled rubber powder with at least one monomer.

27. The process as claimed in claim 1, further comprising contacting the silica-filled rubber powder with at least one monomer and polymerizing.

28. A silica-filled rubber powder, prepared by the process as claimed in claim 1.

29. A composition, comprising a silica-filled rubber powder, wherein the silica-filled rubber powder is prepared by the process as claimed in claim 1.

* * * * *